US012690056B2

(12) United States Patent (10) Patent No.: US 12,690,056 B2

Lin et al. (45) Date of Patent: Jul. 21, 2026

(54) USER EQUIPMENT AND METHOD FOR SIDELINK COMMUNICATION IN UNLICENSED FREQUENCY SPECTRUM BY SAME

(71) Applicant: GUANGDONG OPPO MOBILE TELECOMMUNICATIONS CORP., LTD., Dongguan (CN)

(72) Inventors: Huei-Ming Lin, South Yarra (AU); Yi Ding, Dongguan (CN); Zhenshan Zhao, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 441 days.

(21) Appl. No.: 18/069,536

(22) Filed: Dec. 21, 2022

(65) Prior Publication Data

US 2023/0131345 A1 Apr. 27, 2023

Related U.S. Application Data

(63) Continuation of application No. PCT/CN2020/106176, filed on Jul. 31, 2020.

(51) Int. Cl.
H04W 72/40 (2023.01)
H04L 1/1607 (2023.01)
(Continued)

(52) U.S. Cl.
CPC ........... H04W 72/40 (2023.01); H04L 1/1607 (2013.01); H04L 1/1812 (2013.01);
(Continued)

(58) Field of Classification Search
CPC . H04W 72/40; H04W 16/14; H04W 74/0808; H04L 1/1607; H04L 1/1812
(Continued)

(56) References Cited

U.S. PATENT DOCUMENTS

2020/0029318 A1* 1/2020 Guo ...................... H04L 5/0055
2020/0037343 A1* 1/2020 He ......................... H04W 72/20
(Continued)

FOREIGN PATENT DOCUMENTS

CN 111342941 A 6/2020
WO 2020017939 A1 1/2020
(Continued)

OTHER PUBLICATIONS

EPO, Extended European Search Report for EP Application No. 20947625.8, Aug. 18, 2023.
(Continued)

*Primary Examiner* — Asad M Nawaz
*Assistant Examiner* — Hugh Mark Ashley
(74) *Attorney, Agent, or Firm* — Hodgson Russ LLP

(57) ABSTRACT

A method for sidelink (SL) communication in an unlicensed frequency spectrum includes receiving a configuration for a SL transmission, monitoring a hybrid automatic repeat request-acknowledgement (HARQ-ACK) response in a physical sidelink feedback channel (PSFCH) according to the configuration for the SL transmission, performing a listen-before-talk (LBT) operation to gain access to a channel according to the HARQ-ACK response, and performing the SL transmission after the LBT operation.

12 Claims, 4 Drawing Sheets

(51) Int. Cl.

| | | |
|---|---|---|
| *H04L 1/1812* | (2023.01) | |
| *H04L 5/00* | (2006.01) | |
| *H04W 16/14* | (2009.01) | |
| *H04W 74/0808* | (2024.01) | |

(52) U.S. Cl.
  CPC ........... *H04L 5/0055* (2013.01); *H04W 16/14*
              (2013.01); *H04W 74/0808* (2013.01)

(58) Field of Classification Search
  USPC ......................................................... 370/329
  See application file for complete search history.

(56) References Cited

U.S. PATENT DOCUMENTS

| | | | |
|---|---|---|---|
| 2020/0154404 A1 | 5/2020 | Goktepe et al. | |
| 2020/0220694 A1 | 7/2020 | Khoryaev et al. | |
| 2022/0255680 A1* | 8/2022 | Moon ................... | H04W 72/21 |
| 2023/0113672 A1* | 4/2023 | Wu ....................... | H04L 1/1861 |
| | | | 370/329 |
| 2023/0136864 A1* | 5/2023 | Lei ........................ | H04L 5/0055 |
| | | | 370/329 |
| 2023/0164835 A1* | 5/2023 | Ganesan ........... | H04W 74/0808 |
| | | | 370/329 |

FOREIGN PATENT DOCUMENTS

| | | |
|---|---|---|
| WO | 2020022752 A1 | 1/2020 |
| WO | 2020069111 A1 | 4/2020 |
| WO | 2022011671 A1 | 1/2022 |

OTHER PUBLICATIONS

Asia Pacific Telecom, "Discussion on sidelink resource allocation mode 2," 3GPP TSG-RAN WG1 Meeting #98, R1-1908929, Aug. 2019.
Zte et al., "Discussion on Rel-16 NR UE Features," 3GPP TSG RAN Meeting #87e, RP-200226, Mar. 2020.
WIPO, International Search Report and Written Opinion for PCT/CN2020/106176, Apr. 27, 2021.

\* cited by examiner

30

700

USER EQUIPMENT AND METHOD FOR SIDELINK COMMUNICATION IN UNLICENSED FREQUENCY SPECTRUM BY SAME

CROSS-REFERENCE TO RELATED APPLICATION(S)

This application is a continuation of International Application No. PCT/CN2020/106176, filed Jul. 31, 2020, the entire disclosure of which is incorporated herein by reference.

BACKGROUND OF DISCLOSURE

1. Field of the Disclosure

The present disclosure relates to the field of communication systems, and more particularly, to a user equipment (UE) and a method for sidelink (SL) communication in an unlicensed frequency spectrum by the same, which can provide a good communication performance and high reliability.

2. Description of the Related Art

In today's world, usage of unlicensed frequency spectrum/bands for short distance-range wireless communication is widespread in everyone's live, particularly with WiFi and Bluetooth radio access technologies (RATs) for indoor home/office/shopping center environment and wearable/entertainment devices, because users do not need to pay to use an unlicensed spectrum and an eco-system is very substantial such that practically making these wireless communication modules at a very low cost. Besides these popular wireless technologies, there are other less known RATs that have been developed in the past also making use of the unlicensed spectrum today for different purposes and applications. For example, a dedicated short-range communications (DSRC) wireless technology based on IEEE 802.11p protocol was developed for vehicle-to-everything (V2X) communication, and a license assisted access (LAA) technology as part of the 4G long term evolution (LTE) advanced Pro system and the recently completed 5G new radio in unlicensed (NR-U) for mobile cellular communications was developed by 3GPP. Therefore, it is very likely that devices of different RATs will exist together in a same geographical area and need to work concurrently at the same time.

However, channel bandwidth allocated for the unlicensed frequency spectrum, depending on region in the world, typically it is not very large to satisfy the usage of all the different RATs and applications. In order to ensure indiscriminating usage and fair spectrum sharing of the unlicensed radio resources for devices of different RATs to coexist together, the most commonly used channel access scheme adopted by various devices today is the listen-before-talk (LBT) protocol that allows the devices to coexist in the unlicensed spectrum while maintaining the performance of each individual system. As the name suggests, for a device intend to transmit on an unlicensed radio channel using the LBT protocol, it first "listens" in a receiver mode to the radio channel, then performs "talking"/transmission in a transmitter mode if the channel is unoccupied. If the channel is busy, then the device backs off/waits for a time period before it tries/listens again.

As part of 5G new radio (5G-NR) sidelink (SL) resource allocation and transmission mechanism, a SL user equipment (UE) device selects one or more SL resources from a set of candidate resources and reserves them by indication in sidelink control information (SCI) for future retransmissions of a transport block (TB). For the next/future TBs, the SL UE is also allowed to reserve SL resources periodically. Once these resources are announced/reserved in the SCI, other SL UEs will avoid selecting the same resources and thus evade transmission collisions. Although generally it is a good practice to reserve SL resources to avoid transmit (Tx) collisions and to fulfil the required quality of service (QoS) for the data traffic TB as such, however, there can exist an over-booking issue where some of the reserved SL resources are no longer needed and later-on left unused. For example, when a SL UE receives an positive acknowledgement (ACK) response in a hybrid automatic repeat request (HARQ)-ACK report for an TB transmitted in physical sidelink shared channel (PSSCH)/physical sidelink control channel (PSCCH), the remaining SL resources reserved by the PSCCH would no longer be needed by the UE for retransmitting the same TB.

However, since these remaining SL resources are not released for use by other SL UEs, there exist an over-booking issue, where these remaining resources will be left unused and thus wasted. For the unlicensed frequency spectrum, radio resource usage and channel access can be exceptionally precious since it is free for use by many devices and different RATs. Any resource wastage can be particularly harmful to the overall fair sharing principle and coexistence. Furthermore, if radio resource usage is coordinated among SL UEs in a groupcast, by not performing SL transmission in a pre-assigned/coordinated Tx timing using the already reserved resources, this could mean losing access to the radio channel and the remaining transmission opportunities in the same groupcast. And thus, affecting not only the Tx-UE itself, but also other UEs in the group.

For a current SL resource reporting and transmission channel access scheme, there are the following issues: the above over-booking issue in SL communication, and a potential loss of access to the radio channel issue if a prior reserved/pre-allocated transmission resource/timing is not used. How to solve the above issues is still a challenge.

Therefore, there is a need for a user equipment (UE) and a method for sidelink (SL) communication in an unlicensed frequency spectrum by the same, which can decrease a resource over-booking issue in SL communication and/or resolve an issue of potential loss of access to a radio channel when operating in an unlicensed frequency spectrum.

SUMMARY

An object of the present disclosure is to propose a user equipment (UE) and a method for sidelink (SL) communication in an unlicensed frequency spectrum by the same, which can decrease a resource over-booking issue in SL communication and/or resolve an issue of potential loss of access to a radio channel when operating in an unlicensed frequency spectrum.

In a first aspect of the present disclosure, a user equipment for sidelink (SL) communication in an unlicensed frequency spectrum includes a memory, a transceiver, and a processor coupled to the memory and the transceiver. The transceiver is configured to receive a configuration for a SL transmission, the processor is configured to monitor a hybrid automatic repeat request-acknowledgement (HARQ-ACK) response in a physical sidelink feedback channel (PSFCH)

according to the configuration for the SL transmission, the processor is configured to perform a listen-before-talk (LBT) operation to gain access to a channel according to the HARQ-ACK response, and the transceiver is configured to perform the SL transmission after the LBT operation.

In a second aspect of the present disclosure, a method for sidelink (SL) communication in an unlicensed frequency spectrum by a user equipment includes receiving a configuration for a SL transmission, monitoring a hybrid automatic repeat request-acknowledgement (HARQ-ACK) response in a physical sidelink feedback channel (PSFCH) according to the configuration for the SL transmission, performing a listen-before-talk (LBT) operation to gain access to a channel according to the HARQ-ACK response, and performing the SL transmission after the LBT operation.

In a third aspect of the present disclosure, a non-transitory machine-readable storage medium has stored thereon instructions that, when executed by a computer, cause the computer to perform the above method.

In a fourth aspect of the present disclosure, a chip includes a processor, configured to call and run a computer program stored in a memory, to cause a device in which the chip is installed to execute the above method.

In a fifth aspect of the present disclosure, a computer readable storage medium, in which a computer program is stored, causes a computer to execute the above method.

In a sixth aspect of the present disclosure, a computer program product includes a computer program, and the computer program causes a computer to execute the above method.

In a seventh aspect of the present disclosure, a computer program causes a computer to execute the above method.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

In some embodiments of the present disclosure, a user equipment (UE) and a method for sidelink (SL) communication in an unlicensed frequency spectrum by the same are provided to decrease a resource over-booking issue in SL communication and/or resolve an issue of potential loss of access to a radio channel when operating in an unlicensed frequency spectrum. In some embodiments, for a SL resource reporting and transmission channel access scheme, it aims to resolve the above over-booking issue in SL communication by UE dynamic reporting to its higher layer HARQ-ACK results received and/or newly released SL resources, and the potential loss of access to the radio channel issue by continuing to transmit using the reserved resources or pre-allocated timing slots. In some embodiments, other benefits of adopting the newly invented HARQ-based resource reporting and transmission channel access scheme in 5G-NR sidelink communication include:

Reduced transmission collisions from detecting and reusing immediately released resources from other UEs.

Ideal for urgent packet transmissions with short communication latency requirement, resulting from frequent dynamic reporting, and reutilization of resources that were previously reserved by another device, giving some level of prior protection. Furthermore, the required processing complexity for the proposed scheme is significantly reduced without needing to perform the entire resource selection procedure which involves full sensing of radio resource pool, a reference signal received power (RSRP) measurement of received SCI and exclusion of reserved resources from other UEs.

Figure 1:
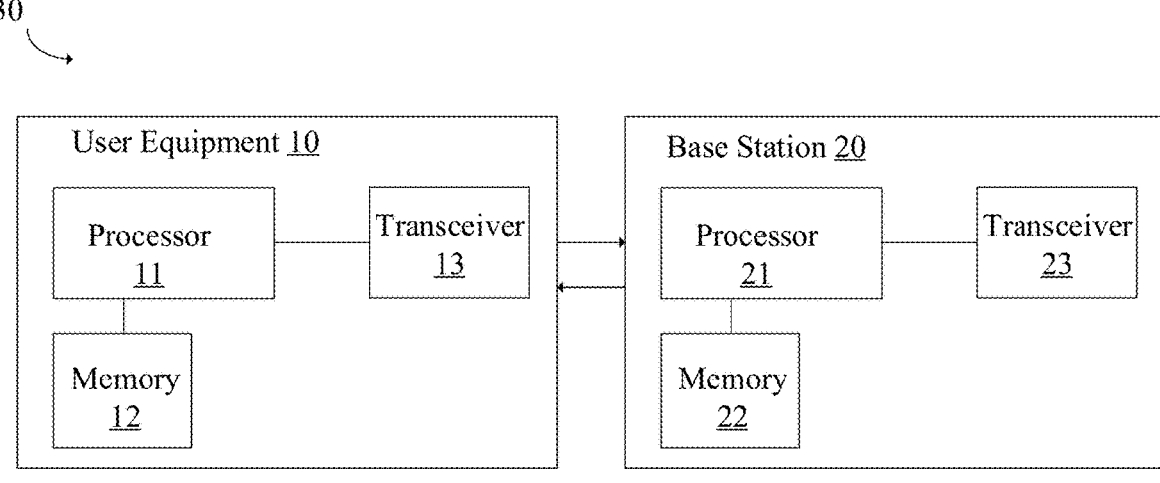
FIG. 1 is a block diagram of one or more user equipments (UEs) and a base station of communication in a communication network system according to an embodiment of the present disclosure.

FIG. 1 illustrates that, in some embodiments, one or more user equipments (UEs) 10 and a base station 20 of communication in a communication network system 30 according to an embodiment of the present disclosure are provided. The communication network system 30 includes the UE 10 and the base station 20. The UE 10 may include a memory 12, a transceiver 13, and a processor 11 coupled to the memory 12, the transceiver 13. The base station 20 may include a memory 22, a transceiver 23, and a processor 21 coupled to the memory 22, the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

The communication between UEs relates to vehicle-to-everything (V2X) communication including vehicle-to-vehicle (V2V), vehicle-to-pedestrian (V2P), and vehicle-to-infrastructure/network (V21/N) according to a sidelink technology developed under 3rd generation partnership project (3GPP) long term evolution (LTE) and new radio (NR) Release 17 and beyond. UEs are communicated with each other directly via a sidelink interface such as a PC5 interface. Some embodiments of the present disclosure relate to sidelink communication technology in 3GPP NR release 17 and beyond.

In some embodiments, the transceiver 13 is configured to receive a configuration for a SL transmission, the processor 11 is configured to monitor a hybrid automatic repeat request-acknowledgement (HARQ-ACK) response in a physical sidelink feedback channel (PSFCH) according to the configuration for the SL transmission, the processor 11 is configured to perform a listen-before-talk (LBT) operation to gain access to a channel according to the HARQ-ACK response, and the transceiver 13 is configured to perform the SL transmission after the LBT operation. This can decrease a resource over-booking issue in SL communication and/or resolve an issue of potential loss of access to a radio channel when operating in an unlicensed frequency spectrum.

In some embodiments, the configuration for the SL transmission comprises a network radio resource control (RRC) configuration or a pre-configuration of a UE-selected mode resource pool. In some embodiments, monitoring the HARQ-ACK response in the PSFCH comprises at least one of the following: detecting a positive acknowledgement (ACK) response in the PSFCH, decoding a physical sidelink shared channel (PSSCH), or a non-detection of a negative acknowledgement (NACK) response in the PSFCH. In some embodiments, detecting the ACK response in the PSFCH is used for a SL unicast transmission. In some embodiments, decoding the PSSCH is used for a SL unicast transmission. In some embodiments, the non-detection of the NACK response in the PSFCH is used for a SL groupcast transmission.

In some embodiments, the processor 11 is configured to determine a reserved but unused/released SL resource associated with the HARQ-ACK response. In some embodiments, the transceiver 13 is configured to report, to a higher layer, a reserved but unused/released SL resource associated with the HARQ-ACK response. In some embodiments, reporting, to the higher layer, the reserved but unused/released SL resource associated with the HARQ-ACK response is performed according at least one of the following: after detecting the ACK response in the PSFCH, after decoding the PSSCH, after the non-detection of the NACK response in the PSFCH, in each slot containing PSFCH resources, for which the processor has monitored the HARQ-ACK response in the PSFCH, or periodically, once every X ms, where X is configurable or pre-configurable. In some embodiments, performing the SL transmission after the LBT operation comprises transmitting the PSCCH and/or the PSSCH using the reserved but unused/released SL resource associated with the HARQ-ACK response.

In some embodiments, monitoring the HARQ-ACK response in the PSFCH comprises monitoring the PSFCH at least in a slot where the processor 11 expects the HARQ-ACK response to an earlier transmission. In some embodiments, the processor 11 is configured to determine whether a retransmission of the earlier transmission is necessary or not according to the HARQ-ACK response. In some embodiments, if the retransmission of the earlier transmission is determined to be necessary, the transceiver 13 uses a reserved resource and/or a pre-allocated timing slot for the retransmission of the earlier transmission. In some embodiments, the retransmission of the earlier transmission is determined to be necessary according to detecting a NACK response in the PSFCH. In some embodiments, if the retransmission of the earlier transmission is determined to be not necessary, the transceiver 13 continues to perform the SL transmission using a reserved resource and/or a pre-allocated timing slot to maintain a channel occupancy time (COT) for a group where the UE 10 locates in. In some embodiments, the retransmission of the earlier transmission is determined to be not necessary according to detecting only an ACK response in the PSFCH or a non-detection of a NACK response in the PSFCH. In some embodiments, the SL transmission is used for at least one of the following: the retransmission of the earlier transmission, a new PSSCH transmission, or a keep alive message and/or dummy data transmission. In some embodiments, performing the SL transmission after the LBT operation comprises transmitting the SL transmission in a pre-allocated timing slot.

Figure 2:
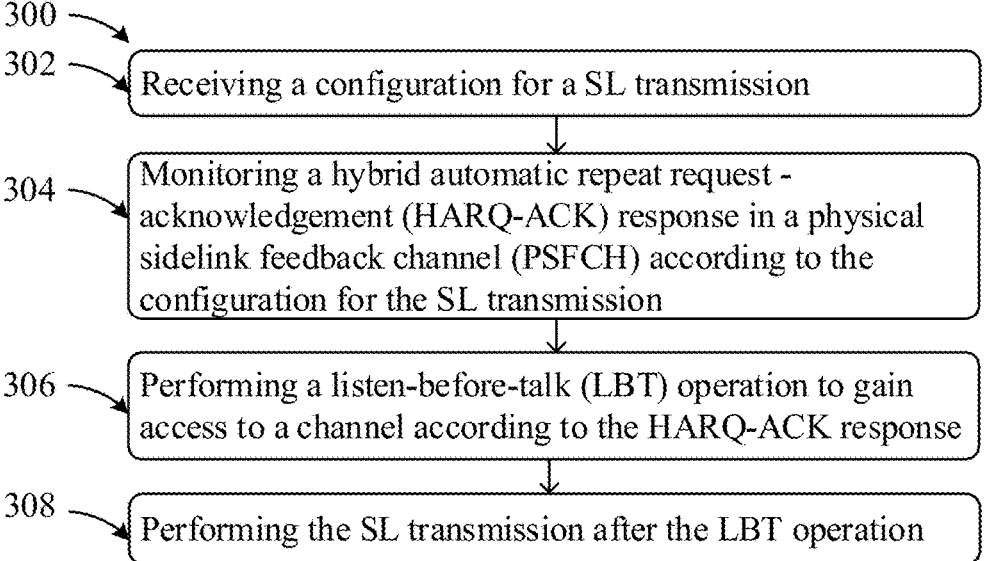
FIG. 2 is a flowchart illustrating a method for sidelink (SL) communication in an unlicensed frequency spectrum by a user equipment according to an embodiment of the present disclosure.

FIG. 2 illustrates a method 300 for sidelink (SL) communication in an unlicensed frequency spectrum by a user equipment according to an embodiment of the present disclosure. In some embodiments, the method 300 includes: a block 302, receiving a configuration for a SL transmission, a block 304, monitoring a hybrid automatic repeat request-acknowledgement (HARQ-ACK) response in a physical sidelink feedback channel (PSFCH) according to the configuration for the SL transmission, a block 306, performing a listen-before-talk (LBT) operation to gain access to a channel according to the HARQ-ACK response, and a block 308, performing the SL transmission after the LBT operation. This can decrease a resource over-booking issue in SL communication and/or resolve an issue of potential loss of access to a radio channel when operating in an unlicensed frequency spectrum.

In some embodiments, the configuration for the SL transmission comprises a network radio resource control (RRC) configuration or a pre-configuration of a UE-selected mode resource pool. In some embodiments, monitoring the HARQ-ACK response in the PSFCH comprises at least one of the following: detecting a positive acknowledgement (ACK) response in the PSFCH, decoding a physical sidelink shared channel (PSSCH), or a non-detection of a negative acknowledgement (NACK) response in the PSFCH. In some embodiments, detecting the ACK response in the PSFCH is used for a SL unicast transmission. In some embodiments, decoding the PSSCH is used for a SL unicast transmission. In some embodiments, the non-detection of the NACK response in the PSFCH is used for a SL groupcast transmission.

In some embodiments, the method further comprises determining a reserved but unused/released SL resource associated with the HARQ-ACK response. In some embodiments, the method further comprises reporting, to a higher layer, a reserved but unused/released SL resource associated with the HARQ-ACK response. In some embodiments, reporting, to the higher layer, the reserved but unused/released SL resource associated with the HARQ-ACK response is performed according at least one of the following: after detecting the ACK response in the PSFCH, after decoding the PSSCH, after the non-detection of the NACK response in the PSFCH, in each slot containing PSFCH resources, for which the processor has monitored the HARQ-ACK response in the PSFCH, or periodically, once every X ms, where X is configurable or pre-configurable. In some embodiments, performing the SL transmission after the LBT operation comprises transmitting the PSCCH and/or the PSSCH using the reserved but unused/released SL resource associated with the HARQ-ACK.

In some embodiments, monitoring the HARQ-ACK response in the PSFCH comprises monitoring the PSFCH at least in a slot where the processor expects the HARQ-ACK response to an earlier transmission. In some embodiments, the method further comprises determining whether a retransmission of the earlier transmission is necessary or not according to the HARQ-ACK response. In some embodiments, if the retransmission of the earlier transmission is determined to be necessary, the UE uses a reserved resource and/or a pre-allocated timing slot for the retransmission of the earlier transmission. In some embodiments, the retransmission of the earlier transmission is determined to be necessary according to detecting a NACK response in the PSFCH. In some embodiments, if the retransmission of the earlier transmission is determined to be not necessary, the UE continues to perform the SL transmission using a reserved resource and/or a pre-allocated timing slot to maintain a channel occupancy time (COT) for a group where the UE locates in. In some embodiments, the retransmission of the earlier transmission is determined to be not necessary according to detecting only an ACK response in the PSFCH or a non-detection of a NACK response in the PSFCH. In some embodiments, the SL transmission is used for at least one of the following: the retransmission of the earlier transmission, a new PSSCH transmission, or a keep alive message and/or dummy data transmission. In some embodiments, performing the SL transmission after the LBT operation comprises transmitting the SL transmission in a pre-allocated timing slot.

In some embodiments, in the present disclosure of inventive methods for sidelink (SL) resource selection and transmission based on SL hybrid automatic repeat request-acknowledgement (HARQ-ACK) response(s), a SL user equipment (UE) operating in a UE autonomous resource selection mode (as known as sidelink mode 2) and (pre-)configured with a "UE-selected' transmission (Tx) resource pool selects one or more SL resources for transmission based on HARQ-ACK responses detected in physical sidelink feedback channel (PSFCH) and performs LBT to gain access to the radio channel before the transmission. In an event when the UE detects a positive acknowledgement (ACK) response in PSFCH or successfully decodes physical sidelink shared channel (PSSCH) for an example SL unicast transmission, or in the event of non-detection of a negative acknowledgement (NACK) response in PSFCH for an example SL groupcast PSSCH transmission, the UE directly reports to its higher layer the detected ACK response and/or the remaining resources that are reserved by the associated physical sidelink control channel (PSCCH). The UE could be the destination receiver UE of a PSSCH/PSCCH transmission in a SL unicast (e.g. a second UE), or a UE that simply monitors HARQ-ACK responses in PSFCH for unicast and groupcast transmissions that it does not need to provide any HARQ-ACK response for the received PSCCH/PSSCH transmission (e.g. a third UE). By detecting one or more of these remaining reserved resources, which are no longer needed by the original reserving UE for transmitting the same transport block (TB), the HARQ-ACK monitoring UE considers these resources are henceforth 'released' and could be used to replace one or more of UE's pre-selected and/or reserved resources, or simply for transmitting a new or urgent TB, in order to help with mitigating the resource wastage issue that comes from over-booking but no longer needed SL resources.

This UE reporting of ACK responses and/or its associated unused/released resources to its higher layer is performed according to one or more of the following timings and conditions: After successful decoding of a unicast PSSCH transmission. After detection of ACK response for a unicast PSSCH/PSCCH transmission, or non-detection of NACK response in PSFCH for a groupcast PSSCH/PSCCH transmission. In each slot containing PSFCH resources, for which the UE has monitored HARQ-ACK. Periodically, once every X ms (e.g. X=1, 2, 5, 10), where X is (pre-)configurable.

In some embodiments, since these 'released' resources are reserved previously, it helps to mitigate and minimize the chance of having Tx collision with another UE, especially when the reporting to UE's higher layer is done frequently in a dynamic manner, e.g. immediately after each ACK detection, successful decoding of an unicast PSSCH transmission, or at an end of every slot which contains PSFCH resources. It can also help to shorten transmission latency for urgent new packets/transport blocks (TBs) to be delivered over sidelink and/or used for replacing one or more of UE pre-selected resources. When the higher layer selects/decides to use one of these reported resources, the UE needs to perform listen-before-talk (LBT) operation to contend for access to the wireless channel. If LBT contention is successful, the UE uses the selected resource for its own sidelink transmission.

Figure 3:
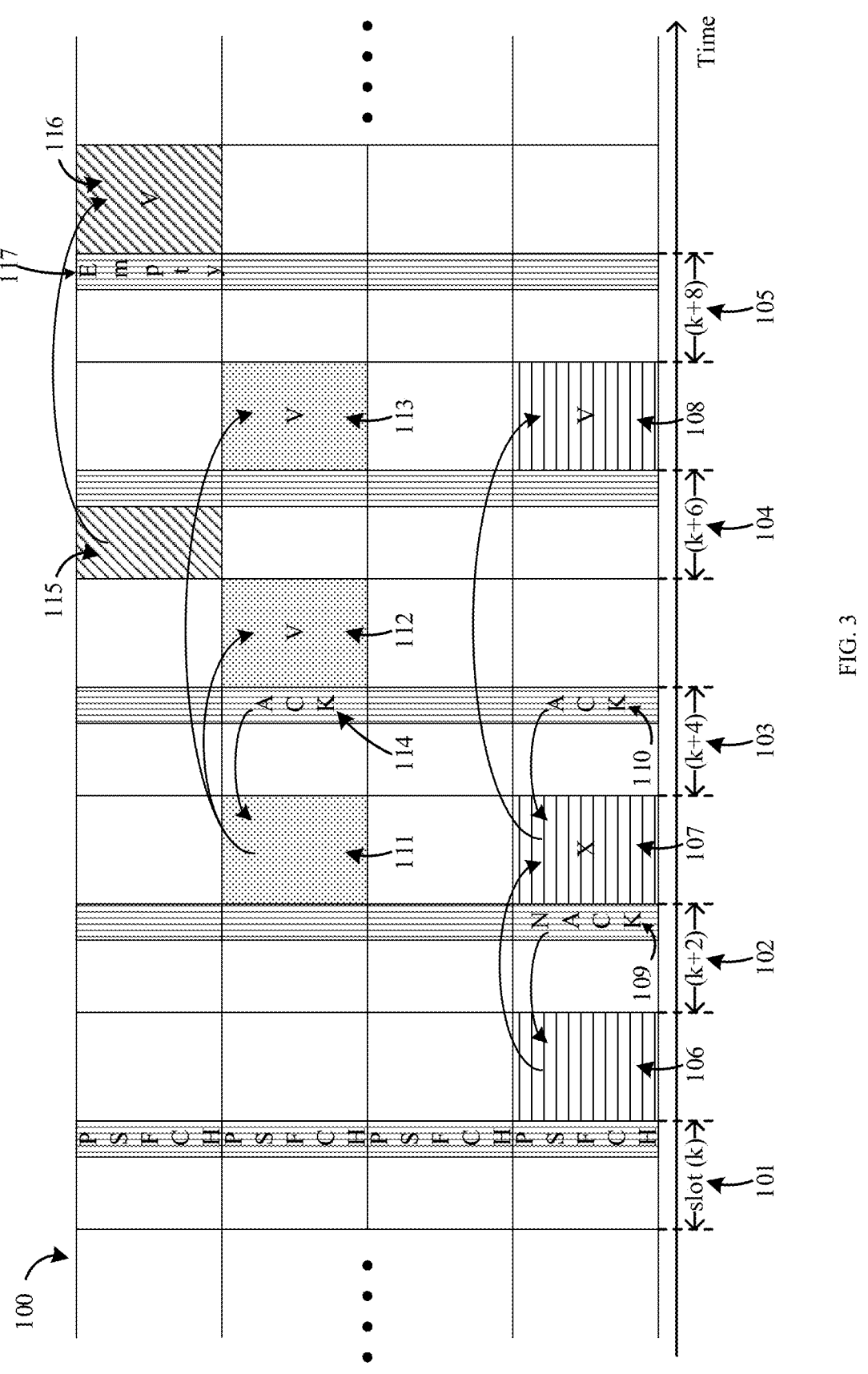
FIG. 3 is an exemplary illustration of a UE monitoring a hybrid automatic repeat request-acknowledgement (HARQ-ACK) response in a SL communication and performing a listen-before-talk (LBT) operation to gain access to a radio channel for transmission using a newly released/available resource according to an embodiment of the present disclosure.

FIG. 3 is an exemplary illustration of a UE monitoring a hybrid automatic repeat request (HARQ) response in a SL communication and performing a listen-before-talk (LBT) operation to gain access to a radio channel for transmission using a newly released/available resource according to an embodiment of the present disclosure. In reference to diagram 100 in FIG. 3, an exemplary illustration of UE monitoring HARQ-ACK responses in sidelink slots containing PSFCH, identifying any reserved but unused/released SL resources and reporting them to the higher layer. FIG. 3 illustrates that, in some embodiments, in the diagram 100, a UE-selected resource pool for sidelink transmission is (pre-)configured to a UE (UE_1) with PSFCH resources allocated in every second slot in slot (k) 101, slot (k+2) 102, slot (k+4) 103, slot (k+6) 104 and slot (k+8) 105 as depicted. When the UE_1 receives a PSSCH/PSCCH transmission in SL resource 106 from a UE (UE_2) and identifies that the HARQ feedback indicator is enabled and a SL resource 107 is reserved for future retransmission in the decoded sidelink control information (SCI), the UE_1 monitors the corresponding PSFCH resource 109 for any potential HARQ-ACK response. In this illustrated example, a negative acknowledgement (NACK) response is detected in PSFCH resource 109 and the UE_1 determines that the reserved SL resource 107 will continue to be used by the UE_2 for the retransmission of the same PSSCH TB. Therefore, based on the detection of the HARQ-ACK response in PSFCH resource 109, the UE_1 reports a NACK or an empty set of resources/nothing to its higher layer.

FIG. 3 further illustrates that, in some embodiments, when the retransmission of the same PSSCH TB is performed in SL resource 107, the UE_2 can continue to enable the HARQ feedback indicator and reserve another SL resource 108 for a subsequent PSSCH TB retransmission in case the PSSCH/PSCCH retransmission is not delivered successfully again. During the same sidelink slot, the UE_1 receives another PSSCH/PSCCH transmission from another UE (UE_3) in SL resource 111, and from the decoded SCI the UE_1 identified the HARQ feedback indicator is also enabled and two future SL resources 112 and 113 are reserved for retransmissions from the UE_3. Then based on the two received separate PSSCH/PSCCH transmissions in 107 and 111, the UE_1 monitors their corresponding PSFCH resources in 110 and 114, respectively. In this illustrated example, a positive acknowledgement (ACK) response is detected by the UE_1 in both PSFCH resource 110 and 114. Based on these detection results, the UE_1 determines that the previously reserved SL resource 108 from the UE_2 and SL resources 112 and 113 from the UE_3 are no longer needed for their subsequent retransmissions of the same PSSCH TB. As such, the UE_1 reports the detected ACK responses and/or a set of these reserved but unused/newly released resources to its higher layer.

FIG. 3 further illustrates that, in some embodiments, in a scenario, the UE_1 receives a PSSCH/PSCCH transmission from another UE (UE_4) in SL resource 115. Based on the decoded SCI, the UE_1 identifies that HARQ feedback indicator has been set to enabled and a future SL resource 116 is reserved for potential retransmission. Moreover, the UE_1 further identifies from the decoded SCI that only-NACK response(s) is required from intended receiver UE(s). That is, if the intended receiver UE is able to successfully decode the PSSCH transmission, it does not need to send an ACK response in the corresponding PSFCH resource. Only if PSSCH decoding is a failure, then the intended receiver UE should provide a NACK response. For this illustration example, the UE_1 monitors for HARQ-ACK response(s) in the corresponding PSFCH resource (117) and detects no NACK response from any UE (e.g. an empty state). In this case, the UE_1 determines the prior reserved SL resource (116) is no longer needed by the UE_4 for retransmission of the same PSSCH TB and thus reported an ACK and/or the reserved but unused/released resource (116) to its higher layer.

In some embodiments, in another method, particularly (but not limit to) for a SL UE participating in a SL unicast or groupcast and has been (pre-)configured with a "UE-selected' transmission (Tx) resource pool and allocated by another UE (e.g. a group header/controller UE) or a cellular network base station with a set of SL resources or timing slots in which only the UE should perform SL transmissions within a channel occupancy time (COT), the SL UE monitors PSFCH at least in slots where it expects HARQ-ACK response from other UEs responding to its PSSCH/PSCCH transmissions. In the event when a negative acknowledgement (NACK) response is received in PSFCH, the UE contends for the access to the radio channel and performs retransmission of the same transport block (TB) in the allocated timing slots and/or resources reserved from the earlier PSCCH/PSSCH transmission. In the event even when a positive acknowledgement (ACK) response is received or non-detection of a negative acknowledgement (NACK) response in PSFCH, the UE will still continue to access the radio channel and perform SL transmission using the allocated and/or reserved resources/timing slots to retain the channel access right for the group or the remaining slots within the COT. In this case, the SL transmission from the UE could be carrying a new PSSCH transport block (TB), a retransmission of the same/last TB, or a 'keep alive' message/dummy data to resolve the potential loss of access to the radio channel issue. The contending for the channel access is done by the UE from performing an LBT (e.g. a short LBT) just before the intended SL transmission.

Figure 4:
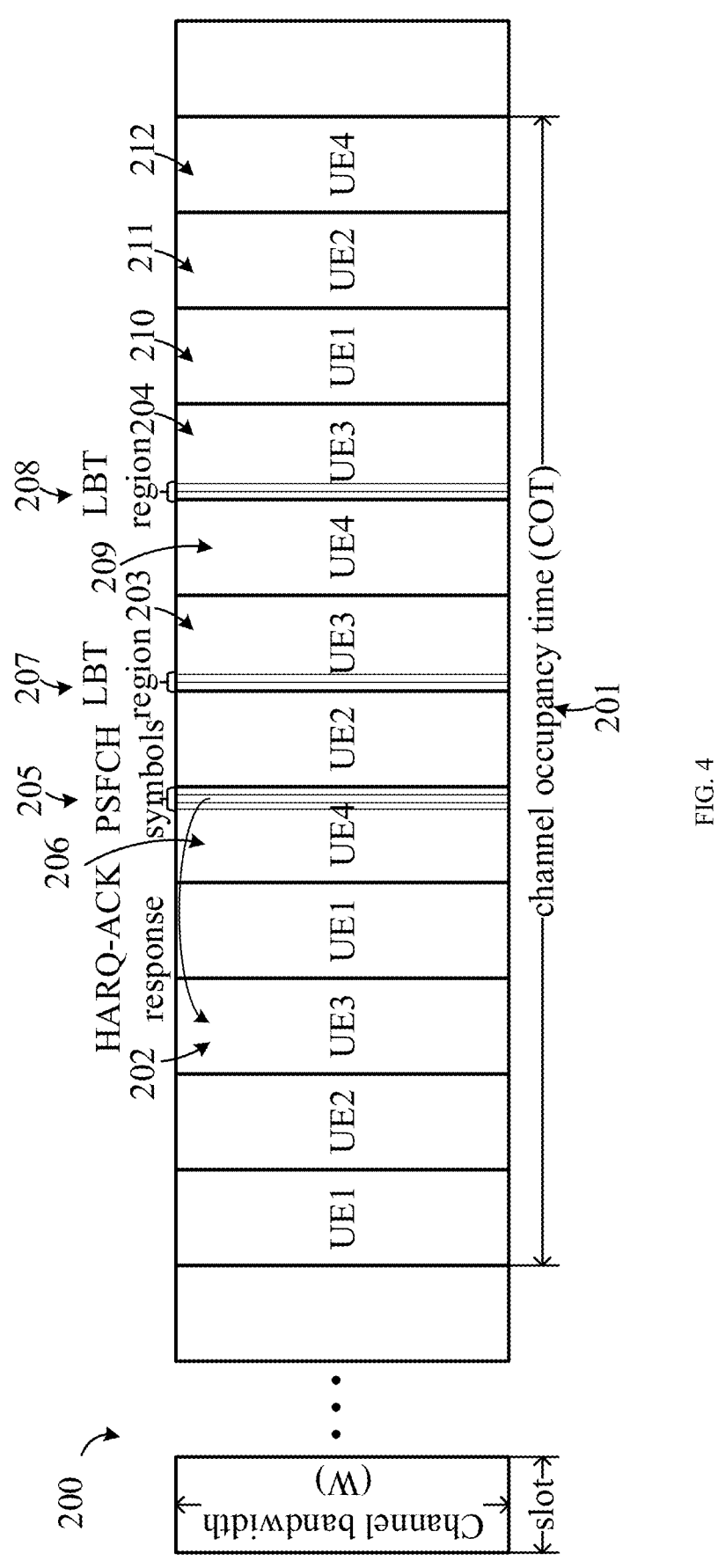
FIG. 4 is an exemplary illustration of a SL groupcast UE continuing accessing a radio channel and performing a SL transmission using a prior allocated/reserved resource to retain channel access right according to an embodiment of the present disclosure.

FIG. 4 is an exemplary illustration of a SL groupcast UE continuing accessing a radio channel and performing a SL transmission using a prior allocated/reserved resource to retain channel access right according to an embodiment of the present disclosure. In reference to diagram 200 in FIG. 4, an exemplary illustration of a set of timing slots within a COT (201) pre-allocated/assigned to sidelink groupcast UEs, and a UE (UE3) from which continues to access the radio channel and perform SL transmissions in the pre-allocated timing slots or using the reserved resources for maintaining the COT for the remainder pre-allocated timing slots and other UEs within the group. The pre-allocated timing slots are coordinated among the sidelink groupcast UEs such that every UE within the group have its own dedicated timing slot for transmission to avoid the half-duplex issue (i.e. no two UEs from the same group should transmit in the same slot so that all member UEs can receive one another's message data).

FIG. 4 illustrates that, in some embodiments, In the diagram 200, the UE3 is pre-allocated/assigned with timing slots 202, 203 and 204 in which the UE3 can perform transmissions for the SL groupcast communication. During the PSSCH/PSCCH transmission in timing slot 202, the UE3 can enable the HARQ feedback indicator in SCI and reserved SL resources in timing slot 203 and 204 in PSCCH. Based on a pre-determined HARQ feedback timing, the UE3 monitors the PSFCH resources/symbols 205 in timing slot 206 for HARQ-ACK response(s) to its PSSCH TB transmission in timing slot 202. If a negative acknowledgement (NACK) is detected, the UE3 can contend for the access to the radio channel in timing slots 203 and 204 to perform retransmission of the same PSSCH TB. If a positive acknowledgement (ACK) is detected, the UE3 can continue to contend for the access to the radio channel by performing LBT during a short LBT region (e.g. first one or a few symbols) 207 and 208 at the beginning of the pre-allocated/assigned timing slots 203 and 204, and can perform SL transmissions using the prior reserved resources to maintaining the COT for the remainder pre-allocated timing slots and other UEs within the group. If the UE3 does not continue to contend for the radio channel access and perform SL transmissions in the pre-allocated/assigned timing slots 203 and 204, an access to a radio channel could be lost to other RATs trying to gain access to an unlicensed channel. As such, UE1, UE2, and UE4 may no longer able to carry out their planned SL transmissions in the pre-allocated/assigned timing slots 209, 210, 211, and 212.

In summary, in some embodiments, in order to minimize the resource over-booking issue in SL communication and resolve the issue of potential loss of access to the radio channel when operating in an unlicensed frequency spectrum, it is proposed for SL UEs to adopt a new SL resource reporting and transmission channel access scheme based on monitoring HARQ-ACK responses in PSFCH. An overall method may comprise at least one of the following.

Receiving from network RRC configuration or pre-configuration of a UE-selected mode resource pool for SL transmission.

In an embodiment, the method further comprises at least one of the following.

Monitoring HARQ-ACK response in PSFCH based on at least decoded SCI.

Determining any reserved but unused/released SL resources.

Reporting of available SL resources (e.g. timing slots and RBs).

Transmitting PSCCH/PSSCH using reported SL resources and performing LBT before to gain access to the channel.

In an embodiment, the method further comprises at least one of the following.

Monitoring PSFCH at least in slot where the UE expects HARQ-ACK response to an earlier transmission.

Determining whether retransmission of the earlier transmitted TB is necessary or not based on the detected HARQ-ACK response(s).

If retransmission of the earlier TB is determined to be necessary (e.g. NACK is detected in the corresponding PSFCH), the UE uses reserved resource and/or pre-allocated timing slot for the retransmission.

If retransmission of the earlier TB is determined to be not necessary (e.g. only ACK or no NACK is detected in the corresponding PSFCH), the UE continue to perform SL transmission using the reserved resource and/or the pre-allocated timing slot to maintain the COT for the group. The SL transmission could be used for one of the following: retransmission of the earlier transmitted TB, a new PSSCH TB, or a 'keep alive' message/dummy data TB.

Performing LBT to gain access to the channel and transmitting SL in the pre-allocated timing slot.

Commercial interests for some embodiments are as follows. 1. Solving issues in the prior art. 2. Decreasing a resource over-booking issue in SL communication. 3. Resolving an issue of potential loss of access to a radio channel when operating in an unlicensed frequency spectrum. 4. Faster processing and reduced power consumption will allow a wireless device to operate in lower temperature and with longer battery time. 5. Better user experience from enhanced system performance coming from reduced loss of access to an unlicensed radio channel. 6. Providing good communication performance. 7. Providing high reliability. 8. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product.

Figure 5:
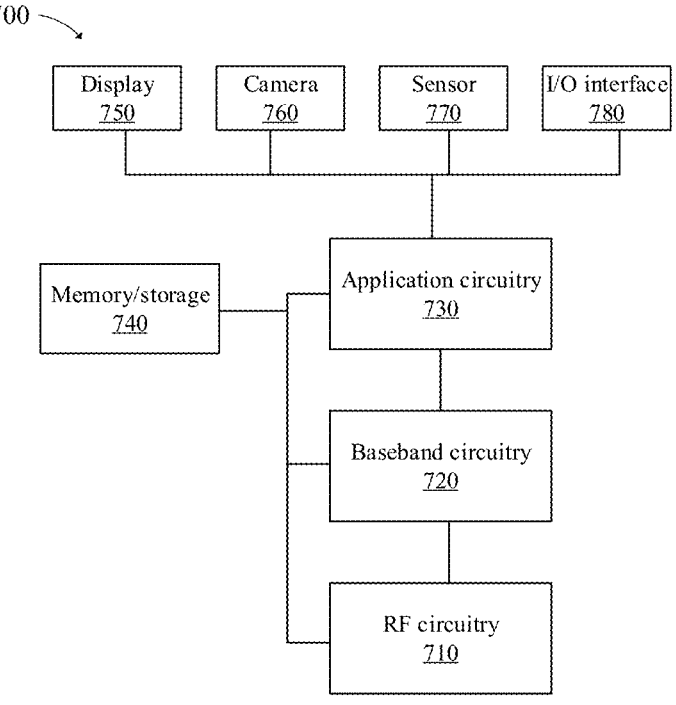
FIG. 5 is a block diagram of a system for wireless communication according to an embodiment of the present disclosure.

FIG. 5 is a block diagram of an example system 700 for wireless communication according to an embodiment of the present disclosure. Embodiments described herein may be implemented into the system using any suitably configured hardware and/or software. FIG. 5 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated.

The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate the communication with the wireless network.

In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry, the application circuitry, and/or the memory/storage may be implemented together on a system on a chip (SOC).

The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, a AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan.

A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A user equipment (UE) for sidelink (SL) communication in an unlicensed frequency spectrum, comprising:

a memory;

a transceiver; and a processor coupled to the memory and the transceiver; wherein:

the transceiver is configured to receive a configuration for a SL transmission;

the processor is configured to monitor a hybrid automatic repeat request-acknowledgement (HARQ-ACK) response in a physical sidelink feedback channel (PSFCH) in a slot where the processor expects the HARQ-ACK response to an earlier transmission, and determine whether a retransmission of the earlier transmission is necessary or not according to the HARQ-ACK response;

the processor is configured to perform a listen-before-talk (LBT) operation to gain access to a channel according to the HARQ-ACK response;

the transceiver is configured to perform the SL transmission after the LBT operation; and the transceiver is further configured to:

receive a configuration of a report cycle;

periodically report, to a higher layer of the UE, a reserved but unused/released SL resource associated with the HARQ-ACK response once every report cycle;

perform, in response to the retransmission of the earlier transmission being determined to be necessary, the retransmission of the earlier transmission; and perform, in response to the retransmission of the earlier transmission being determined to be not necessary, transmission of dummy data by using the reserved but unused/released SL resource.

2. The UE of claim 1, wherein monitoring the HARQ-ACK response in the PSFCH comprises at least one of the following:

detecting a positive acknowledgement (ACK) response in the PSFCH;

decoding a physical sidelink shared channel (PSSCH); or a non-detection of a negative acknowledgement (NACK) response in the PSFCH.

3. The UE of claim 2, wherein detecting the ACK response in the PSFCH is used for a SL unicast transmission.

4. The UE of claim 2, wherein decoding the PSSCH is used for a SL unicast transmission.

5. The UE of claim 2, wherein the non-detection of the NACK response in the PSFCH is used for a SL groupcast transmission.

6. The UE of claim 1, wherein performing the SL transmission after the LBT operation comprises transmitting a PSCCH and/or a PSSCH using the reserved but unused/released SL resource associated with the HARQ-ACK response.

7. The UE of claim 1, wherein the retransmission of the earlier transmission is determined to be necessary according to detecting a NACK response in the PSFCH.

8. The UE of claim 1, wherein the retransmission of the earlier transmission is determined to be not necessary according to detecting only an ACK response in the PSFCH or a non-detection of a NACK response in the PSFCH.

9. The UE of claim 1, wherein the SL transmission is further used for at least one of the following:

the retransmission of the earlier transmission;

a new PSSCH transmission; or a keep alive message.

10. The UE of claim 1, wherein performing the SL transmission after the LBT operation comprises transmitting the SL transmission in a pre-allocated timing slot.

11. A method for sidelink (SL) communication in an unlicensed frequency spectrum by a user equipment (UE), comprising:

receiving a configuration for a SL transmission;

monitoring a hybrid automatic repeat request-acknowledgement (HARQ-ACK) response in a physical sidelink feedback channel (PSFCH) in a slot where the UE expects the HARQ-ACK response to an earlier transmission, and determine whether a retransmission of the earlier transmission is necessary or not according to the HARQ-ACK response;

performing a listen-before-talk (LBT) operation to gain access to a channel according to the HARQ-ACK response; and performing the SL transmission after the LBT operation;

wherein the method further comprises:

receiving a configuration of a report cycle;

periodically reporting, to a higher layer of the UE, a reserved but unused/released SL resource associated with the HARQ-ACK response once every report cycle;

performing, in response to the retransmission of the earlier transmission being determined to be necessary, the retransmission of the earlier transmission; and performing, in response to the retransmission of the earlier transmission being determined to be not necessary, transmission of dummy data by using the reserved but unused/released SL resource.

12. A non-transitory machine-readable storage medium having stored thereon instructions that, when executed by a user equipment (UE), cause the UE to perform actions comprising:

receiving a configuration for a SL transmission;

monitoring a hybrid automatic repeat request-acknowledgement (HARQ-ACK) response in a physical sidelink feedback channel (PSFCH) in a slot where the UE expects the HARQ-ACK response to an earlier transmission, and determine whether a retransmission of the earlier transmission is necessary or not according to the HARQ-ACK response;

performing a listen-before-talk (LBT) operation to gain access to a channel according to the HARQ-ACK response; and performing the SL transmission after the LBT operation;

wherein the actions further comprise:

receiving a configuration of a report cycle;

periodically reporting, to a higher layer of the UE, a reserved but unused/released SL resource associated with the HARQ-ACK response once every report cycle;

perform, in response to the retransmission of the earlier transmission being determined to be necessary, the retransmission of the earlier transmission; and perform, in response to the retransmission of the earlier transmission being determined to be not necessary, transmission of dummy data by using the reserved but unused/released SL resource.

\* \* \* \* \*